A. ALARY.
AUTOMATIC CROSSING GATE.
APPLICATION FILED OCT. 9, 1913.
1,125,925.
Patented Jan. 26, 1915.
8 SHEETS—SHEET 3.
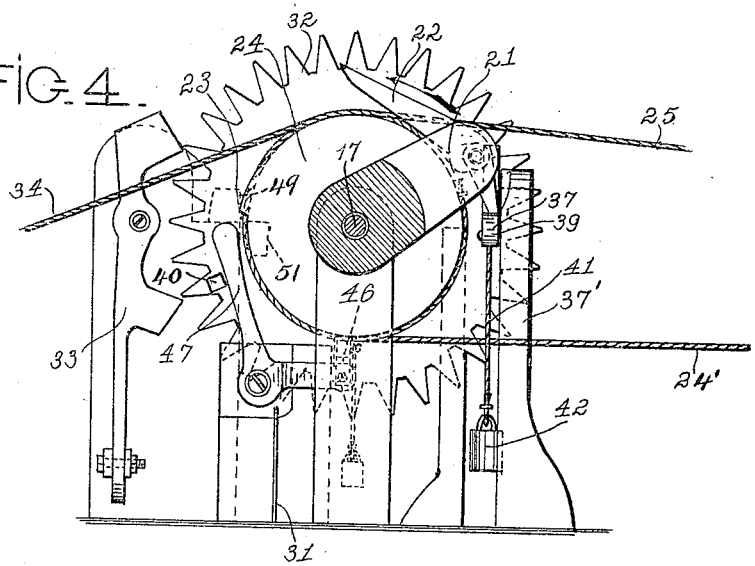
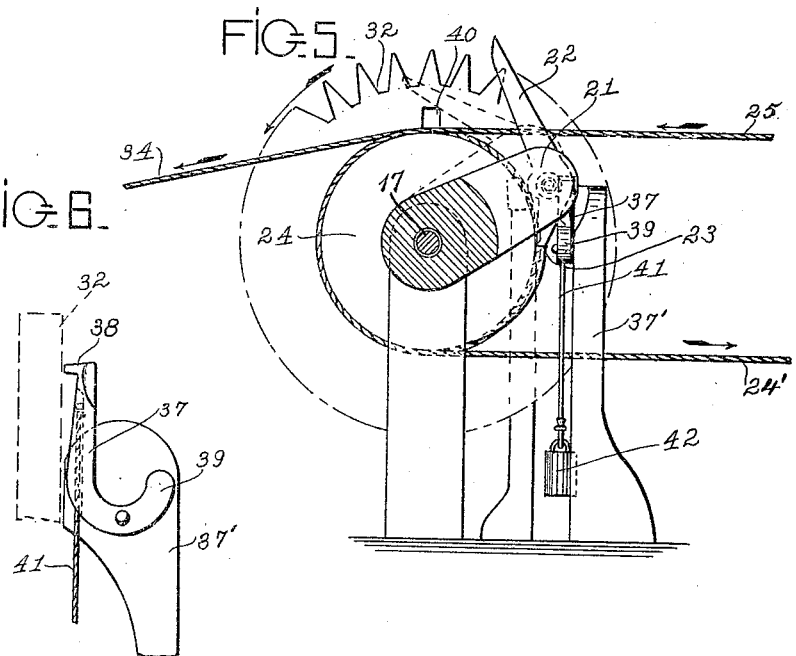
Witnesses:
Henry H. Babcock.
A. Bastien
Alphonse Alary. Inventor
By Marion & Marion
Attorneys

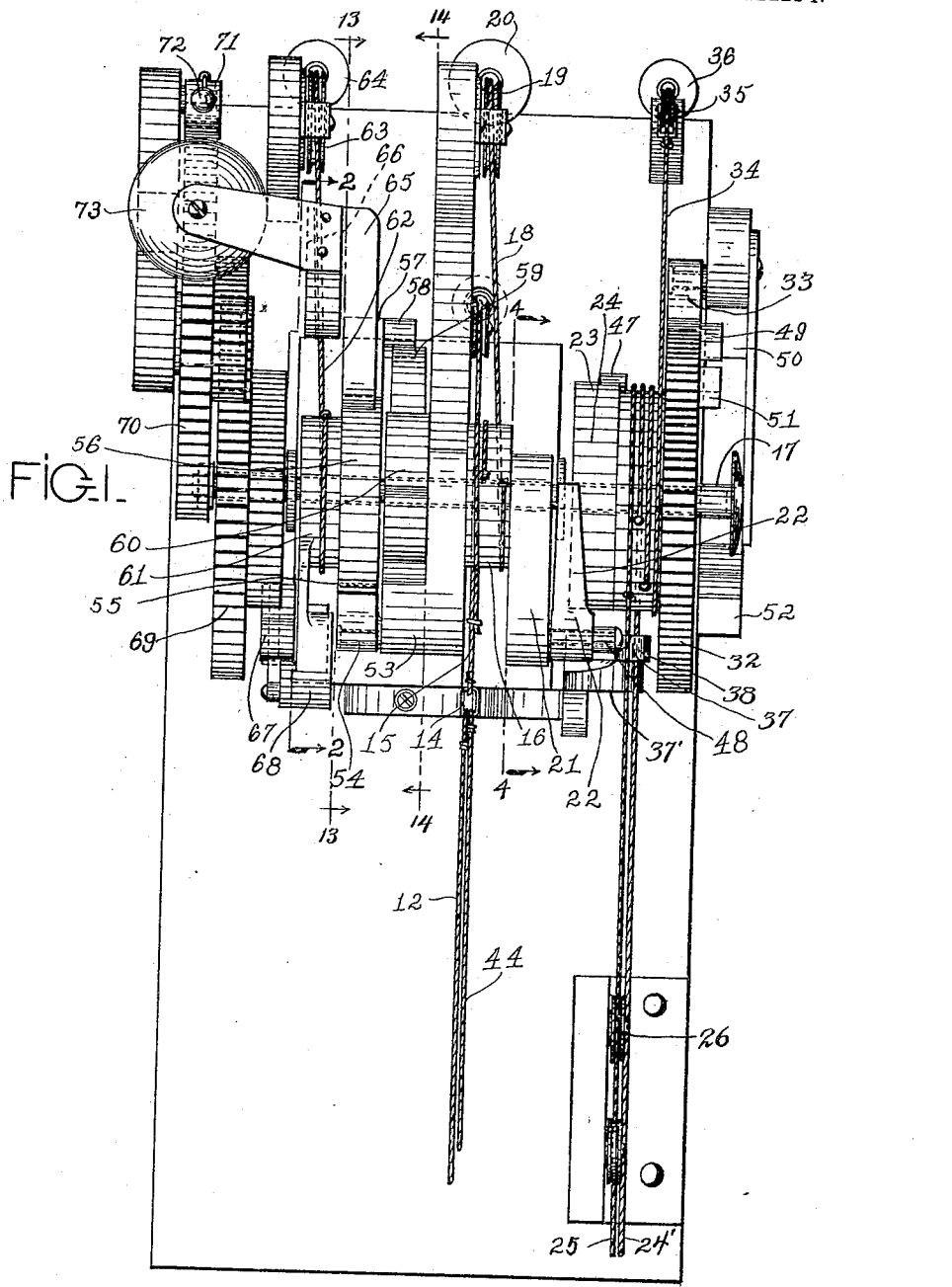

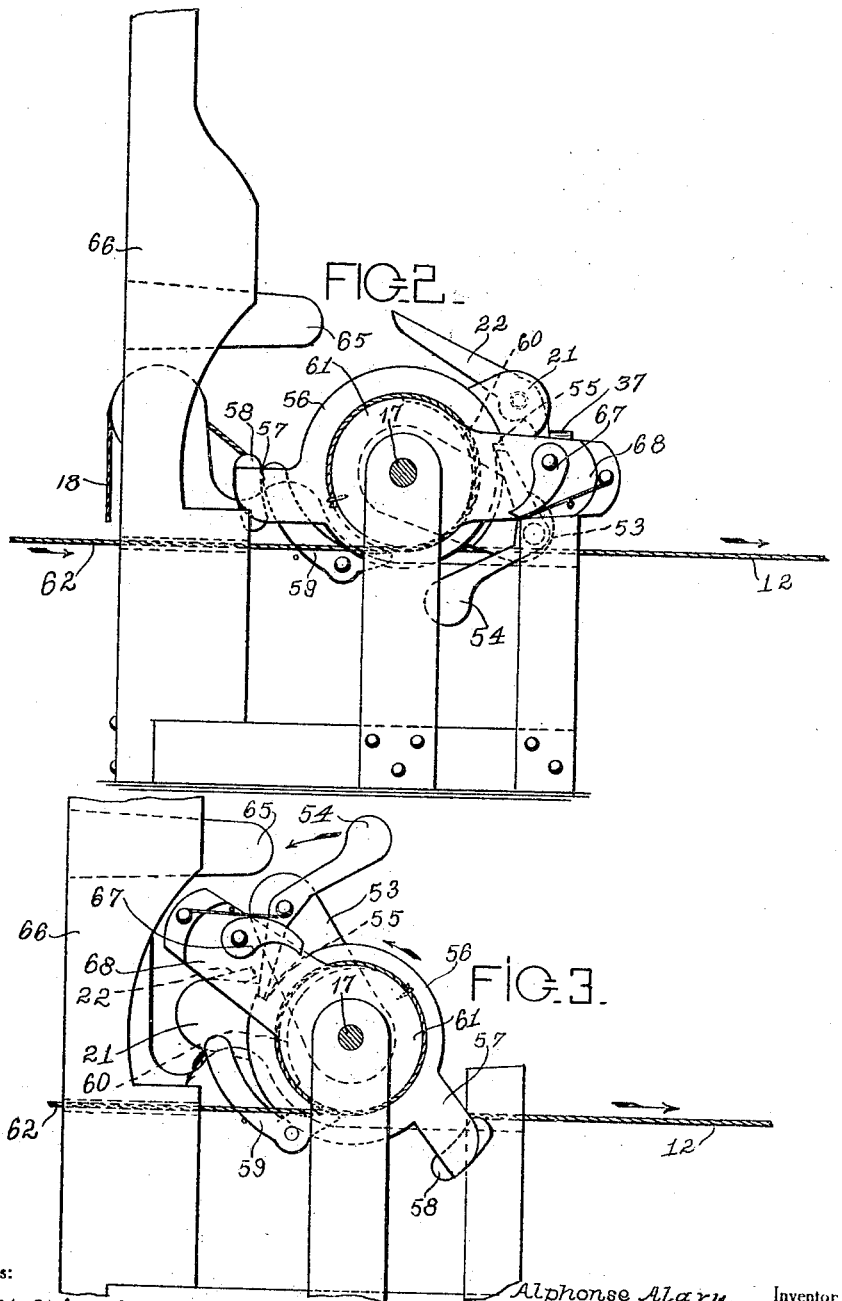

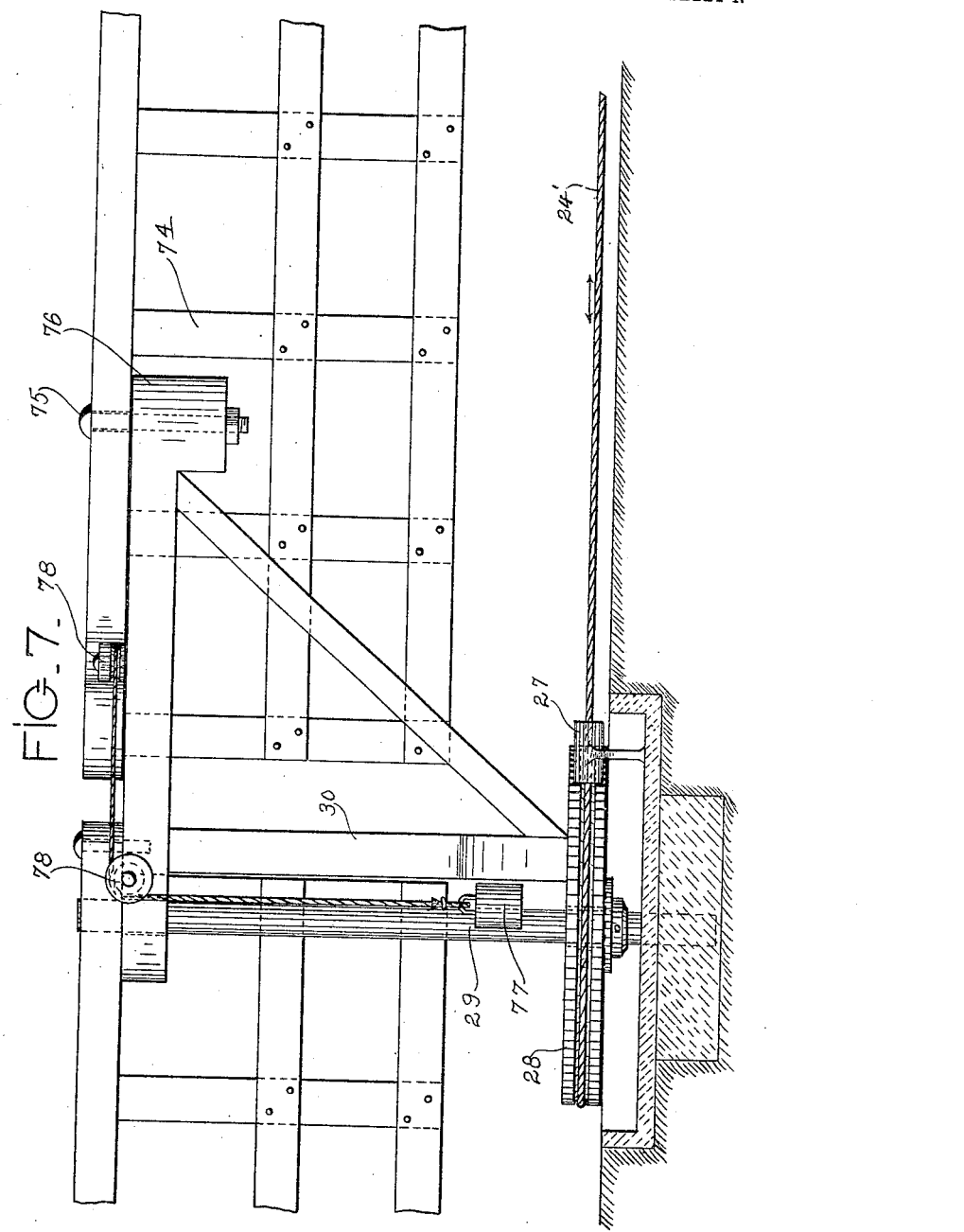

A. ALARY.
AUTOMATIC CROSSING GATE.
APPLICATION FILED OCT. 9, 1913.
1,125,925.
Patented Jan. 26, 1915.
8 SHEETS—SHEET 5.
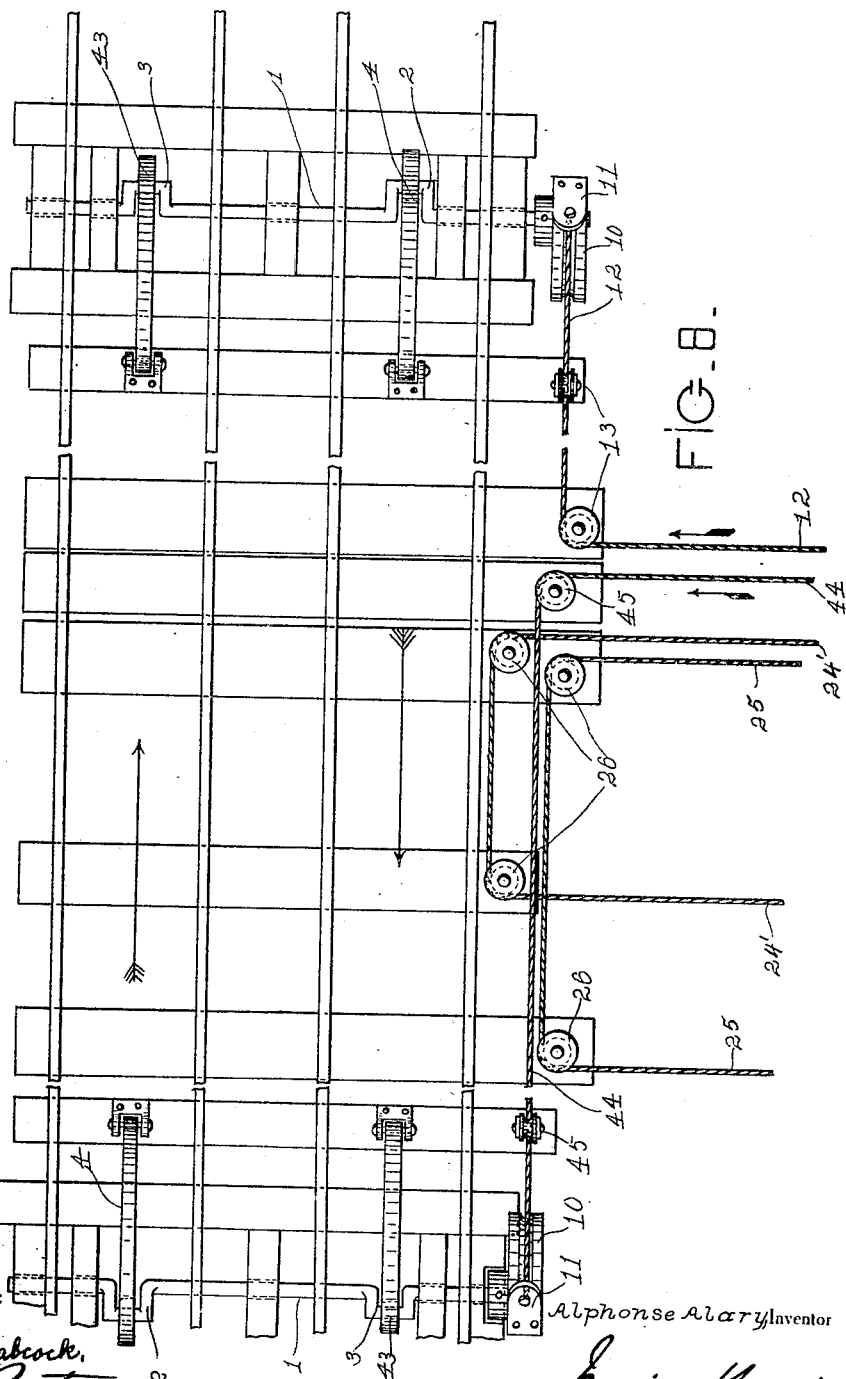

A. ALARY.
AUTOMATIC CROSSING GATE.
APPLICATION FILED OCT. 9, 1913.
1,125,925.
Patented Jan. 26, 1915.
8 SHEETS—SHEET 6.
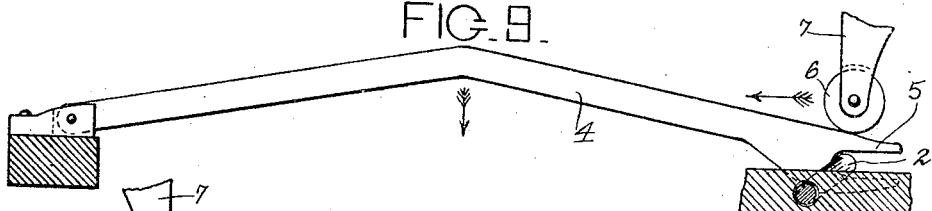
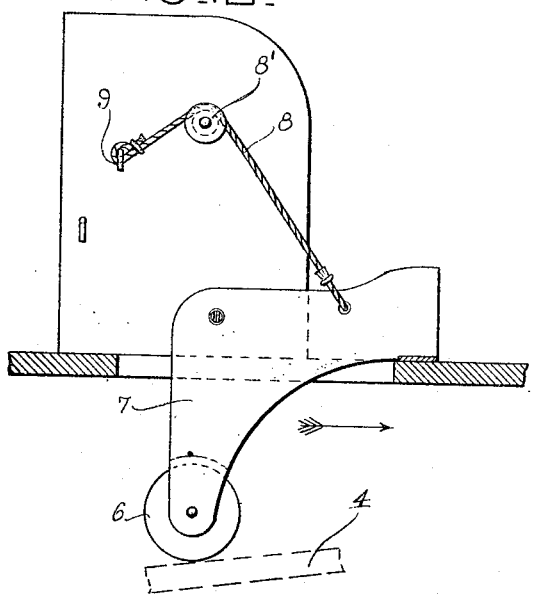
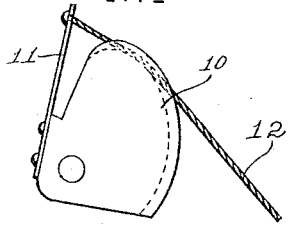
Witnesses:
Henry H. Babcock,
A. Bastien
Alphonse Alary. Inventor
By Marion & Marion
Attorneys

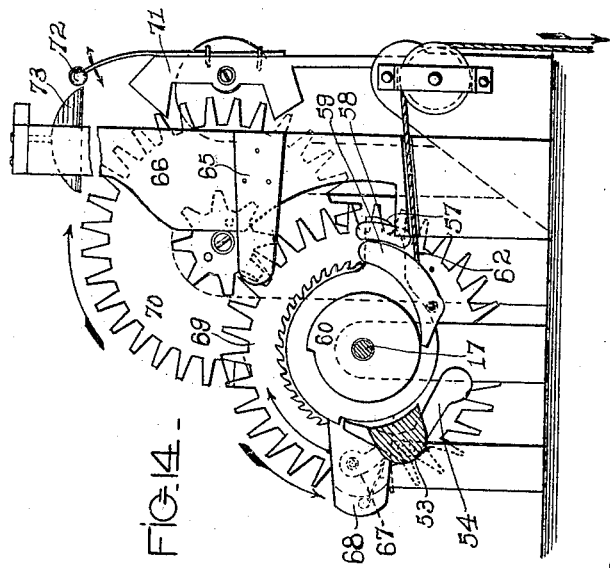
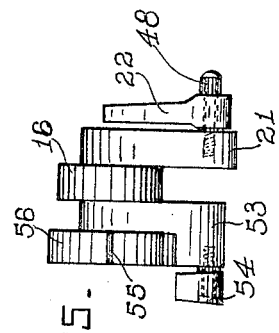
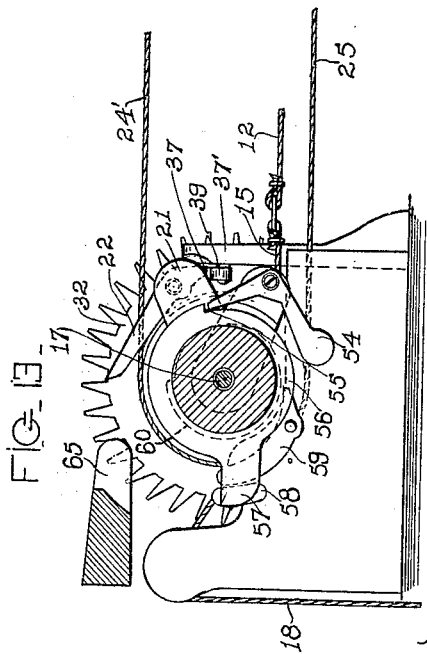

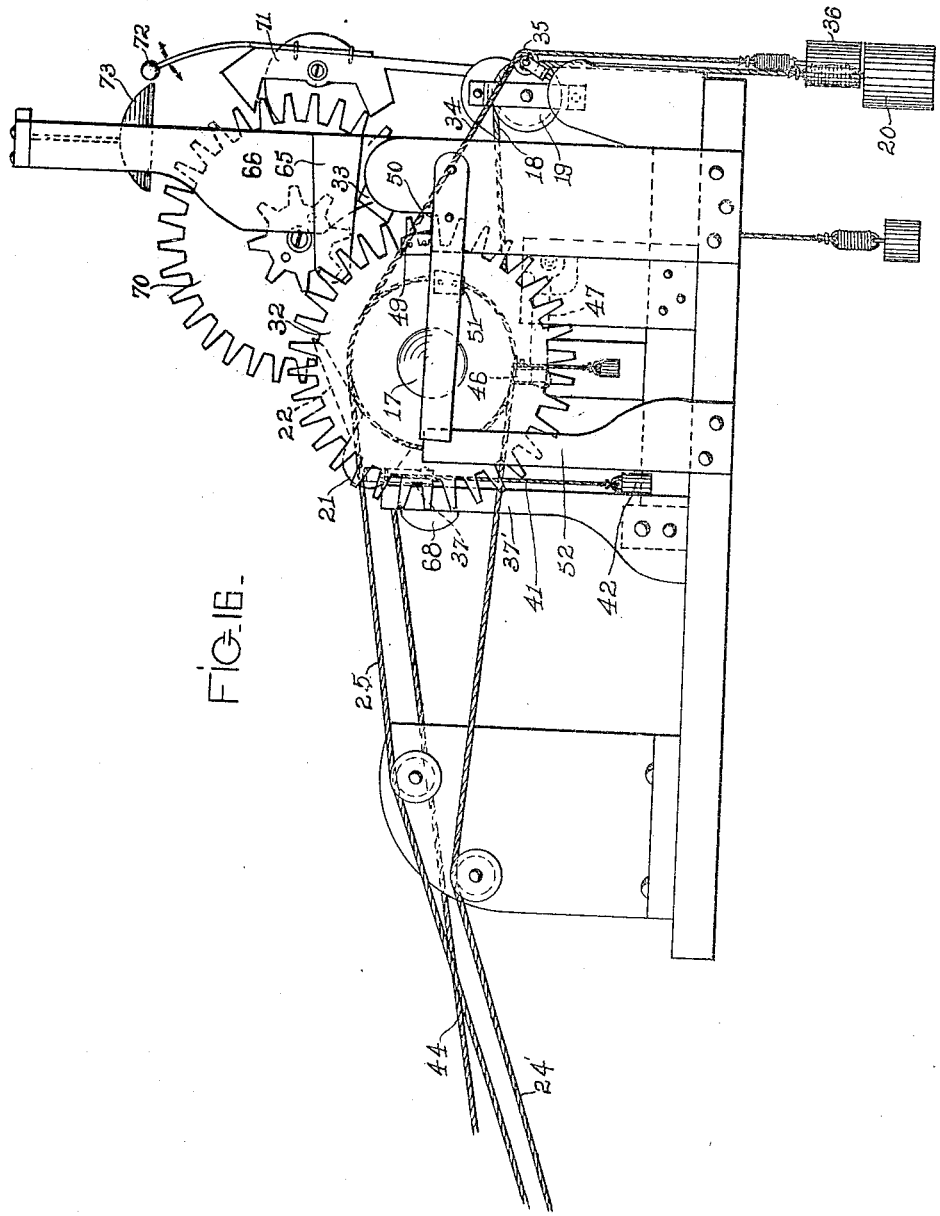

UNITED STATES PATENT OFFICE.

ALPHONSE ALARY, OF ST. CASIMIR, QUEBEC, CANADA.

AUTOMATIC CROSSING-GATE.

1,125,925.  Specification of Letters Patent.  Patented Jan. 26, 1915.

Application filed October 9, 1913. Serial No. 794,257.

*To all whom it may concern:*

Be it known that I, ALPHONSE ALARY, a subject of the King of Great Britain, residing at St. Casimir, Portneuf county, Province of Quebec, Canada, have invented certain new and useful Improvements in Automatic Crossing-Gates; and I do hereby declare that the following is a full, clear, and exact description of the invention, such as will enable others skilled in the art to which it appertains to make and use the same.

The invention to be hereinafter described relates to automatic crossing gates.

In order to more clearly disclose the construction, operation, and use of the invention, reference should be had to the accompanying drawings forming part of the present application.

Throughout the several figures of the drawings like reference characters designate the same parts.

In the drawings: Figure 1 is a top plan view of the actuating mechanism; Fig. 2 is a cross section on line 2—2 of Fig. 1, showing the actuating parts in the position they assume with the gate open; Fig. 3 is a similar view just prior to release of the bell ringing mechanism; Fig. 4 is a cross section on line 4—4 of Fig. 1 showing the release of the gate opening mechanism in operative position; Fig. 5 is a like view, showing the same release acting as a dog for the gate closing mechanism; Fig. 6 is a side elevation of the dog coupling of the actuating mechanism; Fig. 7 is a side elevation of the gate, in open position; Fig. 8 is a plan view of a crossing, with the actuating levers and connections; Fig. 9 is a side elevation of a gate closing lever; Fig. 10 is a like view of an opening lever; Fig. 11 is a side elevation of the cam plate and its yielding connection with one of the gate cables; Fig. 12 is an enlarged side elevation of a trip to engage the lever; Fig. 13 is a sectional view taken on line 13—13 of Fig. 1, looking in the direction of the arrows; Fig. 14 is the same, taken on line 14—14; Fig. 15 is a view in side elevation of the mechanism; and Fig. 16 is a detail top plan view of the double crank for releasing the closing means and the signaling means, and its attached drums.

The main objects of the invention are to provide a simple, efficient, compact, and durable automatic train operated gate closing and gate opening mechanism, in combination with an automatic train actuated signaling mechanism designed to be put into operation immediately prior to the operation of the gate closing means.

Referring to the drawings in detail, 1 indicates a crank shaft extending transversely of a railway track, beneath the rails, and journaled in suitable blocks or bearings. This shaft is provided with a deep crank 2, near one end, and a shallow crank 3, near the opposite end. A gate closing lever 4, having its center considerably raised above the lever ends, is fulcrumed at one end to one of the rail ties or any other suitable support, and has its opposite end forked as at 5 to revolubly receive the crank 2. Depression of the lever, of course, forces the crank down and partially rotates the crank shaft. The lever is adapted to be depressed by means of a roller 6 carried in the outer end of a bell crank lever 7 fulcrumed in the under framing of an engine. The roller may be held in operative position by means of a cord or cable 8 connected at one end to the inner end of the bell crank lever 7 and passed over a guide pulley 8 and finally secured to a hook 9.

To the end of the crank shaft 1 is fixed a circumferentially grooved cam block 10 from which extends, at an angle thereto, a leaf spring 11. To the upper end of this spring is secured one end of an operating cable 12 which extends therefrom, through the groove of the cam block, under and about guide pulleys 13 and is connected by a link 14 to a cable 15 which has one end made fast to a winding drum 16 and is adapted to be wound thereon. Drum 16 is freely revoluble on an axle or shaft 17 journaled in a suitable stand at the side of the railway crossing. To the drum 16 is also connected one end of a cord or cable 18 adapted to be wound thereon. This cable, after passing about the drum, is led over a suitable guide pulley 19, mounted in the frame, and connected to an operating weight 20. Preferably, a coil spring or other yielding connection is inserted in the cable or is used as a connection between the cable end and weight end as a shock absorber when the lever 4 is suddenly depressed by the roller 6. Now, as the lever 4 rocks the rock shaft 1, the cam block 10 will draw the cables 12 and 15 which will cause rotation of drum 16, with consequent winding up of the weighted cable 18.

Rigidly secured to one face of the drum 16 is an arm 21, carrying a pivotally mounted pawl 22 adapted to be brought into engagement with a shoulder 23 on an escapement drum 24 which is freely revoluble on the shaft 17. To this drum are connected the ends of two cables 24' and 25, which are passed around the drum in opposite directions, when either is being wound upon the drum the other is being unwound or paid out at an equal rate. These two cables are passed about suitable guide rollers 26 and also guide brackets 27, whence they are led about the grooved edge of a disk 28, from opposite sides, and connected thereto. This disk is made fast to the lower end of a gate post 29 carrying a crossing gate, to be later described, and rotatably mounted in a suitable base. Thus, winding up of the cable 24', for instance, will cause the gate to be swung to closed position, whereas, winding up of the cable 25 will cause it to be swung to open position. In order to insure engagement between the shoulder 23 and pawl 22, at the right time, a leaf spring 31 is provided. This leaf spring is mounted beneath drum 24 and in the path of the downward and rearward swing of the pawl 22 in such manner as to engage the pawl and rock it into engagement with the shoulder 23 at just the instant that the return swing of the pawl begins, due to the passage of the roller 6 from the closing lever 4.

In order to prevent a sudden slamming of the gate, as might otherwise occur, an escapement wheel 32 is formed integral with or solidly secured to the drum 24 and a cooperating escapement 33 is pivotally mounted in position to coöperate therewith—see Fig. 4. To the drum 24 is also connected one end of a cable 34 which is passed about the drum, carried over a guide roller 35 and provided with a weight 36. This weight 36, however, is much lighter than the weight 20, which, through the connections previously described, acts to rotate the drum 24 for closing the gate. At the same time, it also winds the cable 34 on the drum 24, thereby raising the weight 36 which, in turn, acts to open the gate by rotating drum 24 in the opposite direction, as the weight 36 descends.

In order to prevent premature opening of the gate, a pivoted dog 37 having a nose 38 at one end and an upturned toe 39 at the other end is provided. This dog is mounted on a suitable post or upright 37'. The nose 38 is adapted to drop into one of two notches or recesses 40 in the face of the escapement wheel, at the moment that the gate reaches its closed position. This, of course, locks the escapement wheel and its drum against reverse rotation. A cable 41 attached to the dog and provided with a weight 42, serves to retain the nose 38 in its recess. Now, in order to free the drum 24 so that it may be rotated to open the gate, by the operation of weight 36, an opening lever 43 is provided. This lever is constructed and operated in the same manner as the closing lever, but its angle is much less pronounced and its movement is correspondingly less. It engages the shallower crank 3 of a crank shaft 1 similar in all respects to the one previously described, but mounted at a considerable distance to the opposite side of the crossing. This opening lever operates in the same manner as the closing lever 4 but to a much less degree. Through the cam of its crank shaft, it draws a cable 44 passed over guide pulleys 45 and attached to the link 14. This slight pull acts to again very slightly rotate drum 16 and its arm 21 in the first or winding up direction. In doing so, the pawl 22 is freed from engagement with the shoulder 23. Immediately upon such disengagement, the action of gravity swings the pawl to a position directly above the toe 39 of the dog 37. The operation of the opening lever 43 is just momentary. Consequently, as soon as the strain is taken off of the cord or cable 44, the action of weight 20 brings the tip of the pawl 22 into engagement with the toe 39 and rocks the dog to unseat its nose 38 from the recess 40. This, of course, permits the weight 36 to rotate the drum 24 and open the gate.

To prevent premature closing of the gate, a small lever 46 is provided. This lever is fulcrumed in one of the uprights which supports the shaft 17 and is so arranged that it may be rocked to project one end into the remaining one of the two notches 40 to lock the escapement wheel and its drum against rotation. The opposite end is flexibly connected to one end of one arm of a bell crank lever 47 fulcrumed in a suitable post or bracket. The free end of this bell crank lever is arranged in the path of a small pin or stud 48 mounted on the side of the pawl 22 at its fulcrum point. It may be formed as an extension of the fulcrum pin. The rear edge of the free arm of lever 47 is so shaped that the pin 48 will engage only the upper end. As it does engage the upper end, it will rock the bell crank lever, which will operate the lever 46 and withdraw it from its notch. The dog 37, not being in engagement with its notch at such time, it is necessary to provide other means to counteract the tendency of the weight 36. Therefore, a block 49 is provided on the outer face of the escapement wheel and is so positioned as to engage a post 50 at the moment that the recess 40 falls into position to receive the end of lever 48. This acts as a limit stop and prevents any possible rotation beyond this point, during the momentary engagement between the pin 48 and the end of the bell crank lever 47, as the pawl 22 is swung back to engage the shoulder 23. On the other hand, such momentary engagement between the pin 48 and bell crank lever, as the pawl 22 is being carried in the other direction, is sufficient to free the escapement disk and its drum and permit them to rotate with the pawl and effect the closing of the gate. A suitable block 51 and post 52 act to limit the movement of the escapement disk and drum in the other direction. Furthermore, the positions of these stops are such that the first set prevent the gate from swinging beyond a wide open position (at right angles to the track), while the second set prevent it from swinging beyond the closed position (parallel to the track).

One important feature of the invention is the mechanism for sounding an alarm immediately prior to the closing of the gate. To the drum 16, on the side opposite the arm 21, is secured a second arm 53 carrying a gravity actuated pawl 54 adapted to engage the shoulder 55 of a cam disk 56 which is freely revoluble on the axle 17 and separate from the drum 16 and its parts. This cam disk 56 has a finger 57 which carries a block 58 which is adapted to engage and trip a gravity pawl 59 pivotally mounted on a post or other suitable support beneath the axle 17 and normally engaging the shoulder of a cam disk 60 fixed to the arm 53 and extending about the axle 17. Now, as the drum 16 is rotated by depression of lever 4, the arm 53 and cam disk 60 will travel with it and the gravity pawl 54 will engage the shoulder 55 of the free cam disk 56, carrying it with the arm. Continued rotation will bring the cam disk 60 to such position that its shoulder will be engaged by the gravity pawl 59. During such rotation, a drum 61, formed as part of the disk 56, will wind up a cable or rope 62 which is passed over a guide roller or pulley 63 and provided with an operating weight 64. Engagement between pawl 59 and the shoulder of disk 60 prevents reverse rotation of drum 16 by the weight 20 and, therefore, prevents closing of the gate until the pawl 59 is tripped or disengaged. This gives time for the signal to be sounded just prior to closing the gate. An instant after engagement of pawl 59 with the shoulder of disk 60, the pawl 54 will be brought into engagement with a bar 65 projecting from an upright or post 66 of the frame work of the mechanism. Such engagement will free the shoulder 55 from the pawl and the weight 64 will then rotate the drum 61 and disk 56 reversely. During such reverse rotation, a spring actuated dog 67 carried by an arm 68 extending from one face of the drum 61 will engage one of a train of gears 69 which actuate an escapement wheel 70, thus rotating the escapement wheel. The escapement wheel, in turn, actuates an escapement 71 similar in all respects to the escapement 33 and carrying a bell clapper or tappet 72 adapted to sound a gong 73 suspended from a suitable support. As the drum 61 completes its rotation, the block 58 carried by the cam disk 56 will engage the end of the pawl 59 and free it from the shoulder of the cam disk 60, thereby permitting the weight 20 to rotate drum 16 and cause closing of the gate, as previously set forth.

The gate 30 comprises a triangular or other suitable frame rigidly secured to the rotatable post 29 but adapted to only partially close the crossing. To the other outer corner of such frame is pivotally mounted an auxiliary gate 74. The upper beam of this auxiliary gate over lies the upper beam of the main gate or frame 30 and a pivot bolt 75 is passed through the proximate center of the top beam of the gate 74 and through a sleeve or journal 76 formed in the outer end of gate frame 30. The auxiliary gate is arranged at the inside of frame 30— the side nearest the track. Consequently, any one pushing inwardly against the extreme end, to enter upon the track, will be unable to open the gate 74, because the opposite end will engage the gate frame 30 and prevent such movement. On the other hand, any one pushing in the opposite direction to escape from within the right of way, will be able to force the gate open easily. The auxiliary gate, after such operation, is immediately returned to its normal or operative position by means of a weight 77 attached to one end of a cable which is passed over guide pulleys 78 and has its opposite end secured to the inner end of the top beam of the auxiliary gate 74, all as clearly shown in Fig. 7.

It is thought that the construction, operation, and use of the invention will be clear from the preceding detailed description.

Assuming the parts to be in the positions shown in the drawings, the operation would be as follows: A train traveling toward the left, in Fig. 8, with the roller 6 in operative position, would first engage and depress lever 4, and then lever 43. As lever 4 is depressed rock shaft 1 will be rocked, causing a pull on cable 12. This, through connections 14 and 15, will cause a partial rotation of drum 16, arm 21, and pawl 22, at the same time winding up the weighted cable 18. As the short end of the pawl passes shoulder 23 on the escapement drum, its long end will be engaged by the leaf spring 31 to tip the short end into operative position. By this time, of course, the roller 6 will have left lever 4 and the weight 20 on cable 18 will act on drum 16 to reverse the rotation which, however, is prevented by engagement between pawl 22 and the shoulder 23. Escapement drum 24 is held against rotation by lever 46 engaged in one of the notches 40. As the pawl 22 reaches position to engage shoulder 23, its pin 48 will actuate levers 46 and 47 to free the escapement drum. During this operation, pawl 54, carried by arm 53, will have rotated disk 56 to such point that its block 58 will have engaged and tripped the pawl 59 to free disk 60 connected to arm 53 and drum 16. At the instant that this tripping occurs, weight 20 becomes active, causing rotation of drum 24. Rotation of arm 53, pawl 54, and disk 56 also brings pawl 54 into tripping engagement with bar 65. This engagement is timed to take place considerably in advance of the engagement between block 58 and pawl 59. During this rotation, weighted cable 62 is wound upon disk 61 which is fixed to and rotates with disk 56. Immediately upon tripping of the pawl 54, disks 56 and 61 are free to rotate owing to the power of cable 62 and weight 64. In doing so, dog 67 engages and drives the train of gears and actuates the alarm. Consequently, the alarm will be sounding during a short period prior to the release of pawl 59 and the resulting actuation of drum 24. Now, as drum 24 is rotated, it will wind up cable 24' and weighted cable 34; closing the gate. The escapement will moderate the rotation of drum 24. As the gate reaches its full closed position, stop 51 will engage post 52 and the nose 38 of dog 37 will drop into one of the notches 40, thereby locking the drum 24 against tendency to rotate reversely under the influence of the weighted cable 34. Now, as the roller 6 engages the closing lever 43, there will be a short pull on cable 44 and a correspondingly slight partial rotation of drum 16, arm 21, and pawl 22, in the initial or first direction. This will free pawl 22 from shoulder 23 and the weight 20 will immediately act to draw it in a direction opposite to that in which it has just been drawn by cable 44 and connections. As it moves in this direction, its short end engages the toe 39 of dog 37, thereby disengaging the dog from drum 24 and freeing the drum to rotation under the influence of weighted cable 34. As the drum is rotated in this direction, it winds in cable 25 and pays out cable 24', thereby opening the gate.

Changes may be made in the construction, arrangement, and disposition of the several parts of the invention without in any way departing from the field and scope of the same, and it is meant to include all such within this application wherein only a preferred form has been disclosed.

Having thus fully described my invention, what I claim as new and desire to secure by Letters Patent is:

1. In combination, a closing lever, a crank shaft actuated thereby, a cable actuated by said crank shaft, a drum operated by said cable, a second drum, a gate, a cable connected to said second drum and adapted to swing said gate to closed position, means carried by the first drum and adapted to engage and actuate the second drum, and means for regulating the operation of the second drum.

2. In combination, a closing lever, a crank shaft actuated thereby, a cable actuated by said crank shaft, a drum operated by said cable, a second drum, a gate, a cable connected to said second drum and adapted to swing said gate to closed position, means carried by the first drum and adapted to engage and actuate the second drum, an opening lever, a crank shaft actuated thereby, a cable connected to said crank shaft and to the first named drum to actuate the same, means for retaining the second drum against rotation during the last operation of the first drum, a second cable connected to the second drum and to the gate, and means for actuating the second drum reversely to effect an opening of the gate.

3. In combination, a closing lever, a crank shaft actuated thereby, a cable actuated by said crank shaft, a drum operated by said cable, a second drum, a gate, a cable connected to said second drum and adapted to swing said gate to closed position, means carried by the first drum and adapted to engage and actuate the second drum, an opening lever, a crank shaft actuated thereby, a cable connected to said crank shaft and to the first named drum to actuate the same, means for retaining the second drum against rotation during the last operation of the first drum, a second cable connected to the second drum and to the gate means for actuating the second drum reversely to effect an opening of the gate, and means for regulating the operation of the second drum.

4. In combination, a closing lever, a crank shaft actuated thereby, a cable actuated by said crank shaft, a drum operated by said cable, a disk operated by said drum, a drum carried thereby, a train of gears, means for driving said gears from said disk, means for driving said drum, an escapement actuated by said gears, and a gong sounded by said escapement.

5. In combination, a closing lever, a crank shaft actuated thereby, a cable actuated by said crank shaft, a drum operated by said cable, a disk operated by said drum, a drum carried thereby, a train of gears, means for driving said gears from said disk, means for driving said drum, an escapement actuated by said gears, a gong sounded by said escapement, a drum arranged at the opposite side of the first drum, means for driving the same from the first drum, means for holding the first drum against rotation after depression of the closing lever and during the sounding of the gong, means for then releasing said holding means, and a gate actuated by the third mentioned drum.

In witness whereof I have hereunto set my hand in the presence of two witnesses.

ALPHONSE ALARY.

Witnesses:
ORÉSIME JENIER,
ALBERT GIROUX.

Copies of this patent may be obtained for five cents each, by addressing the "Commissioner of Patents, Washington, D. C."